United States Patent
Lin et al.

(10) Patent No.: US 7,898,218 B2
(45) Date of Patent: Mar. 1, 2011

(54) POWER SUPPLY TOPOLOGIES WITH PWM FREQUENCY CONTROL

(75) Inventors: Chun-Hsi Lin, Yi-Lan Shien (TW); Footshen Wong, Singapore (SG); Chien Kung, Taipei (TW); Chen-Hsiang Yu, Taipei (TW)

(73) Assignee: O2Micro International Limited, Grand Cayman (KY)

( * ) Notice: Subject to any disclaimer, the term of this patent is extended or adjusted under 35 U.S.C. 154(b) by 706 days.

(21) Appl. No.: 11/804,495

(22) Filed: May 17, 2007

(65) Prior Publication Data

US 2008/0061759 A1 Mar. 13, 2008

Related U.S. Application Data

(60) Provisional application No. 60/844,140, filed on Sep. 12, 2006.

(51) Int. Cl.
*H02J 7/00* (2006.01)
(52) U.S. Cl. .................. 320/134; 320/142; 363/19; 363/141; 363/142
(58) Field of Classification Search .................. 320/134, 320/140, 141, 142; 307/37, 73; 363/165
See application file for complete search history.

(56) References Cited

U.S. PATENT DOCUMENTS

| | | | | |
|---|---|---|---|---|
| 6,232,964 | B1 * | 5/2001 | Lee | 345/212 |
| 6,307,356 | B1 * | 10/2001 | Dwelley | 323/282 |
| 6,373,730 | B1 | 4/2002 | Komatsu et al. | |
| 6,417,632 | B1 * | 7/2002 | Yoshida | 315/371 |
| 7,084,612 | B2 * | 8/2006 | Zinn | 323/266 |
| 7,173,403 | B1 * | 2/2007 | Chen et al. | 323/282 |
| 2003/0201758 | A1 * | 10/2003 | Chen | 323/222 |
| 2004/0032242 | A1 * | 2/2004 | Corva et al. | 323/284 |
| 2005/0127881 | A1 * | 6/2005 | Sase et al. | 323/225 |
| 2005/0174818 | A1 * | 8/2005 | Lin et al. | 363/98 |
| 2005/0206354 | A1 * | 9/2005 | Ikezawa | 323/248 |
| 2006/0043955 | A1 | 3/2006 | Hung | |

* cited by examiner

*Primary Examiner*—Edward Tso
*Assistant Examiner*—Arun Williams

(57) ABSTRACT

A power supply topology with pulse width modulation frequency control allows the use of an inductor with higher inductance in a converter. By controlling the switching frequency of the pulse width modulation signal, the inductor can achieve high efficiency during a light load condition and is also suitable for a heavy load condition.

21 Claims, 5 Drawing Sheets

US 7,898,218 B2

POWER SUPPLY TOPOLOGIES WITH PWM FREQUENCY CONTROL

RELATED APPLICATION

This application claims priority to U.S. Provisional Application No. 60/844,140, filed on Sep. 12, 2006, which is hereby incorporated by reference in its entirety.

TECHNICAL FIELD

This invention relates to power management topologies and in particular to power management topologies with pulse width modulation (PWM) control able to support multiple load level applications.

BACKGROUND ART

When choosing an inductor in a switching circuit (e.g., boost/buck converter), there are some concerns including inductance, DC-rating current and direct current resistance (DCR) value. DC-rating current is one of the basic characteristics of an inductor, which represents the maximum current allowed to flow through the inductor. DC-rating current is determined by the inductance, inductor size, and wire, etc. For a given inductor size, the DCR value is directly proportional to the inductance and the DC-rating current is inversely proportional to the inductance.

For a DC/DC boost converter, the efficiency during a light load condition is also directly proportional to the inductance. In order to improve the efficiency, there is a need to choose an inductor with higher inductance. However, as noted above, the higher the inductance, the lower the allowed DC-rating current will be. The peak current through the inductor is equal to the summation of the average current (maximum load current) and the peak ripple current of the inductor. As such, an inductor with higher inductance may not meet requirements when used under heavy load conditions. This is because the peak current through the inductor significantly increases as the average current (maximum load current) increases during the heavy load condition and the current through the inductor may exceed the allowed DC-rating current limit. Therefore, an inductor with higher inductance may not be suitable for a high current/heavy load condition.

There are at least two requirements in choosing an inductor in a boost/buck DC/DC converter. First, the inductor needs to be able to work during the high current condition (the peak current of the inductor should be within the allowed DC-rating current limit). Second, the inductor needs to have high inductance to achieve high efficiency under the low current condition. Since the DC-rating current is inversely proportional to the inductance, it is difficult to choose an inductor that meets both requirements.

SUMMARY

In accordance with one embodiment of the present invention, a converter comprises a generator that generates a pulse width modulation signal for controlling an inductor, and a control circuit coupled to the generator that controls a switching frequency of the pulse width modulation signal. A first switching frequency is selected when a load current is less than a predetermined current level, in one embodiment. A second switching frequency that is greater than the first switching frequency is selected when the load current is greater than the predetermined current level, in one embodiment.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Reference will now be made in detail to embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a power management topology with pulse width modulation frequency control. Advantageously, the frequency of a pulse width modulation signal can be adjusted according to different load conditions, in one embodiment. Such topology allows the use of an inductor with higher inductance which is able to achieve high efficiency during a light load condition and is also suitable for a heavy load condition.

Figure 1:
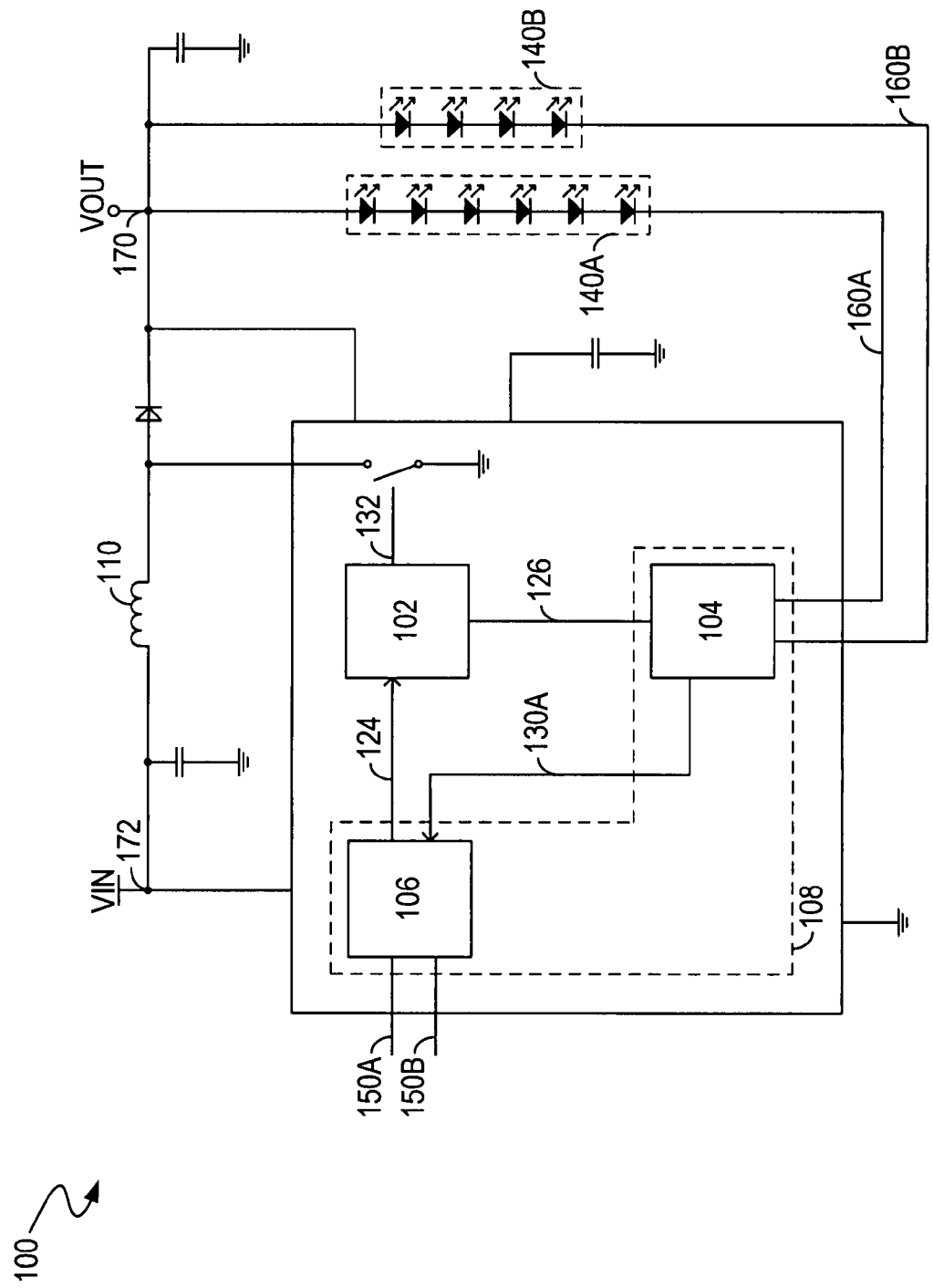
FIG. 1 shows a block diagram of a converter with pulse width modulation frequency control, in accordance with one embodiment of the present invention.

FIG. 1 shows a block diagram of a converter 100 with pulse width modulation frequency control, in accordance with one embodiment of the present invention. As shown in FIG. 1, the converter 100 includes a generator 102 (also referred as the frequency control block) for generating a pulse width modulation signal 132 for controlling an inductor 110, and a control circuit 108 coupled to the generator 102 for controlling a switching frequency of the pulse width modulation signal 132. The inductor 110 is coupled to an input 172 and an output 170.

The converter 100 in the present invention not only supports a single output channel, but also supports multiple output channels. For example, a load 140A and a load 140B are both coupled to the output terminal 170, in one embodiment. The load 140A and the load 140B may include, but are not limited to light-emitting diodes (LEDs). The level of the load current 160A flowing through the load 140A and the level of the load current 160B flowing through the load 140B is different, in one embodiment. For example, the level of the load current 160A (high current sink) is greater than the level of the load current 160B (low current sink).

The switching frequency of the pulse width modulation signal 132 is adjusted according to different load conditions. Advantageously, a first switching frequency f1 (e.g., 1 MHz) is selected when a load current (load current 160A and/or load current 160B) is less than a predetermined current level I0. A second switching frequency f2 (e.g., 4 MHz) that is greater than the first switching frequency f1 is selected when the load current (load current 160A and/or load current 160B) is greater than the predetermined current level I0.

The current through the inductor 110 is controlled by the pulse width modulation signal 132. As a result, a peak-to-peak ripple current of the inductor 110 reaches a first ripple current level $I_{sw1}$ when the load current is less than the predetermined current level I0. The peak-to-peak ripple current of the inductor 110 reaches a second ripple current level $I_{sw2}$ that is less than the first ripple current level $I_{sw1}$ when the load current is greater than the predetermined current level I0.

In one embodiment, the control circuit 108 includes an internal control circuit 104 (also referred as the current control block). The internal control circuit 104 is operable for monitoring the load current (160A and 160B) and generating a first frequency control signal 126 to the generator 102 to control the switching frequency of the pulse width modulation signal 132.

More specifically, when the internal control circuit 104 detects that the load current (160A and/or 160B) is less than a predetermined current level I0, the first frequency control signal 126 will control the generator 102 to generate a pulse width modulation signal 132 with a first switching frequency f1 (e.g., 1 MHz), in one embodiment. When the internal control circuit 104 detects that the load current (160A and/or 160B) is greater than the predetermined current level I0, the first frequency control signal 126 will control the generator 102 to generate a pulse width modulation signal 132 with a second switching frequency f2 (e.g., 4 MHz) that is greater than the first switching frequency f1, in one embodiment.

Furthermore, the internal control circuit 104 can generate a current control signal (not shown) to the generator 102 for adjusting a duty cycle of the pulse width modulation signal 132, in one embodiment.

In one embodiment, the control circuit 108 includes an external control circuit 106 (also referred as the digital control block). The external control circuit 106 is operable for receiving an external control signal and generating a second frequency control signal 124 to the generator 102 to control the switching frequency of the pulse width modulation signal 132.

In one embodiment, the external control signal can be a digital control signal transmitted via an I²C bus including a clock signal line 150A and a data signal line 150B. As a result, the user is able to control the switching frequency of the pulse width modulation signal 132 by transmitting information via the external control signal line (clock signal line 150A and data signal line 150B). Such information may include, but is not limited to the desired load current level.

Advantageously, there is a communication signal line 130A between the internal control circuit 104 and the external control circuit 106. In one embodiment, the communication signal line 130A is configured to transmit information from the internal control circuit 104 to the external control circuit 106. Such information may include, but is not limited to load current level and the switching frequency of the pulse width modulation signal 132.

As a result, the generator 102 receives the first frequency control signal 126 and/or the second frequency control signal 124, and generates a pulse width modulation signal 132 accordingly. The frequency of the pulse width modulation signal 132 can be determined by the first frequency control signal 126, in one embodiment. The frequency of the pulse width modulation signal 132 can be determined by the second frequency control signal 124, in another embodiment.

Accordingly, in accordance with one embodiment of the present invention, the pulse width modulation signal 132 can be controlled by an analog control circuit which is the internal control circuit 104 and/or a digital control circuit which is the external control circuit 106.

Figure 2:
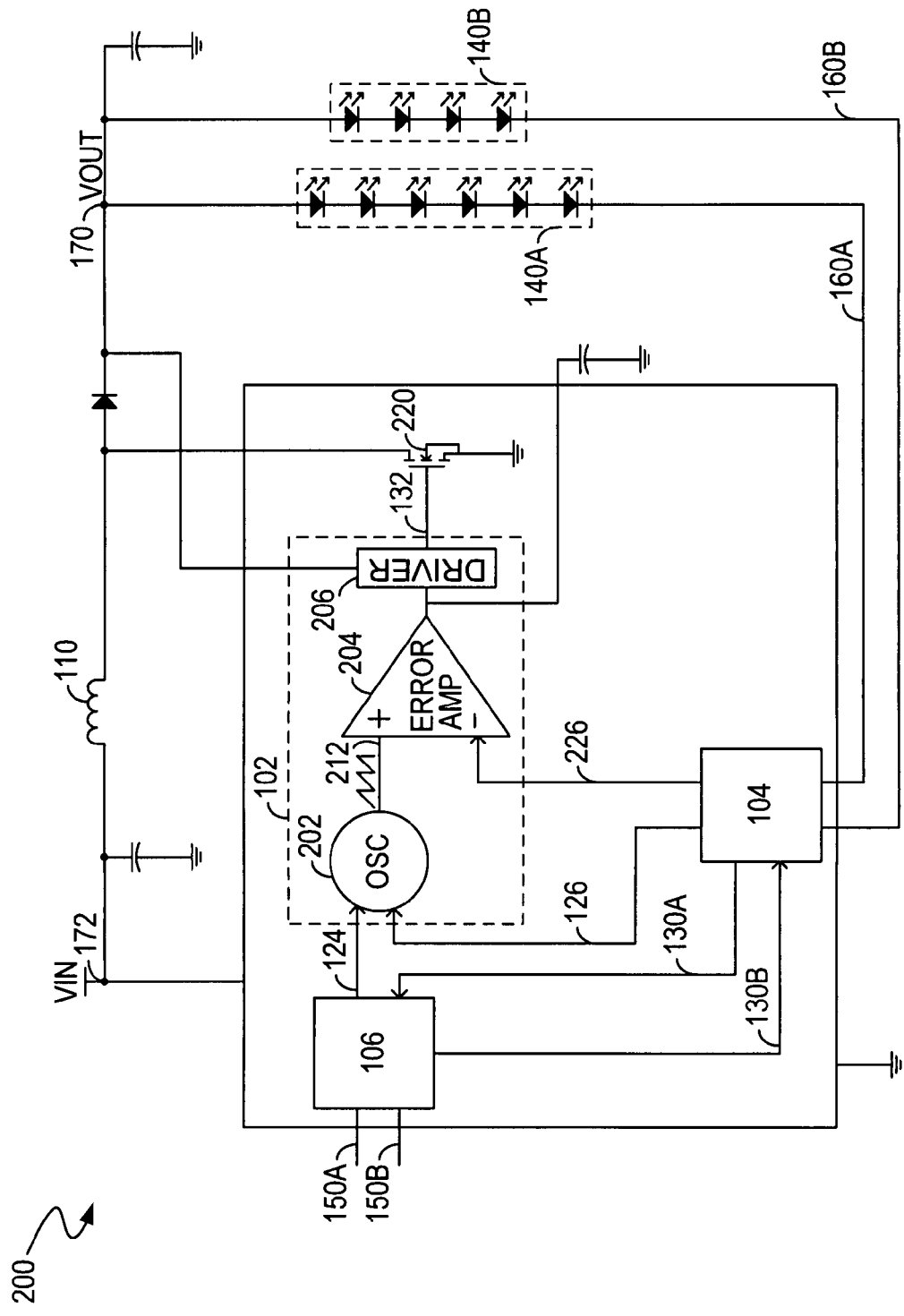
FIG. 2 shows another block diagram of a converter with pulse width modulation frequency control, in accordance with one embodiment of the present invention.

FIG. 2 shows another block diagram of a converter 200 with pulse width modulation frequency control, in accordance with one embodiment of the present invention. Elements that are labeled the same as in FIG. 1 have similar functions and will not be repetitively described herein for purposes of brevity and clarity.

As shown in FIG. 2, the generator 102 includes an oscillator 202 and an amplifier 204, in one embodiment. The generator 202 receives a first frequency control signal 126 and/or a second frequency control signal 124, and generates a ramp signal 212, in one embodiment. For example, the oscillator 202 can generate a ramp signal 212 with a first switching frequency f1 (e.g., 1 MHz) or a ramp signal 212 with a second switching frequency f2 (e.g., 4 MHz) depending on the first frequency control signal 126 and/or the second frequency control signal 124.

The amplifier 204 can be used to receive the ramp signal 212 from the oscillator 202 and receive a current control signal 226 from the internal control circuit 104. The amplifier 204 compares the ramp signal 212 with the current control signal 226, and generates a pulse width modulation signal 132 for controlling a switch 220 via a driver 206, in one embodiment. The switch 220 is coupled to the inductor 110. Therefore, the current through the inductor 110 is adjusted in relation to the pulse width modulation signal 132.

Advantageously, by increasing the switching frequency of the ramp signal 212, the peak-to-peak ripple current of the inductor 110 decreases. More specifically, if the ramp signal 212 has a first switching frequency f1 (e.g., 1 MHz), the switching frequency of the pulse width modulation signal 132 is also equal to the first switching frequency f1. As such, the peak-to-peak ripple current through the inductor 110 will reach a first ripple current level $I_{sw1}$. If the ramp signal 212 has a second switching frequency f2 (e.g., 4 MHz) that is greater than the first switching frequency f1, the switching frequency of the pulse width modulation signal 132 is also equal to the second switching frequency f2. As such, the peak-to-peak ripple current through the inductor 110 will reach a second ripple current level $I_{sw2}$ that is less than the first ripple current level $I_{sw1}$.

Furthermore, the converter 200 includes a communication signal line 130A and a communication signal line 130B. In one embodiment, the communication signal line 130A is configured to transmit information from the internal control circuit 104 to the external control circuit 106. Such information may include, but is not limited to load current level and the switching frequency of the pulse width modulation signal 132. In one embodiment, the external control block 106 transmits information to the internal control block 104 via the communication signal line 130B. Such information may include, but is not limited to the switching frequency of the oscillator 202 and the desired load current level.

Figure 3:
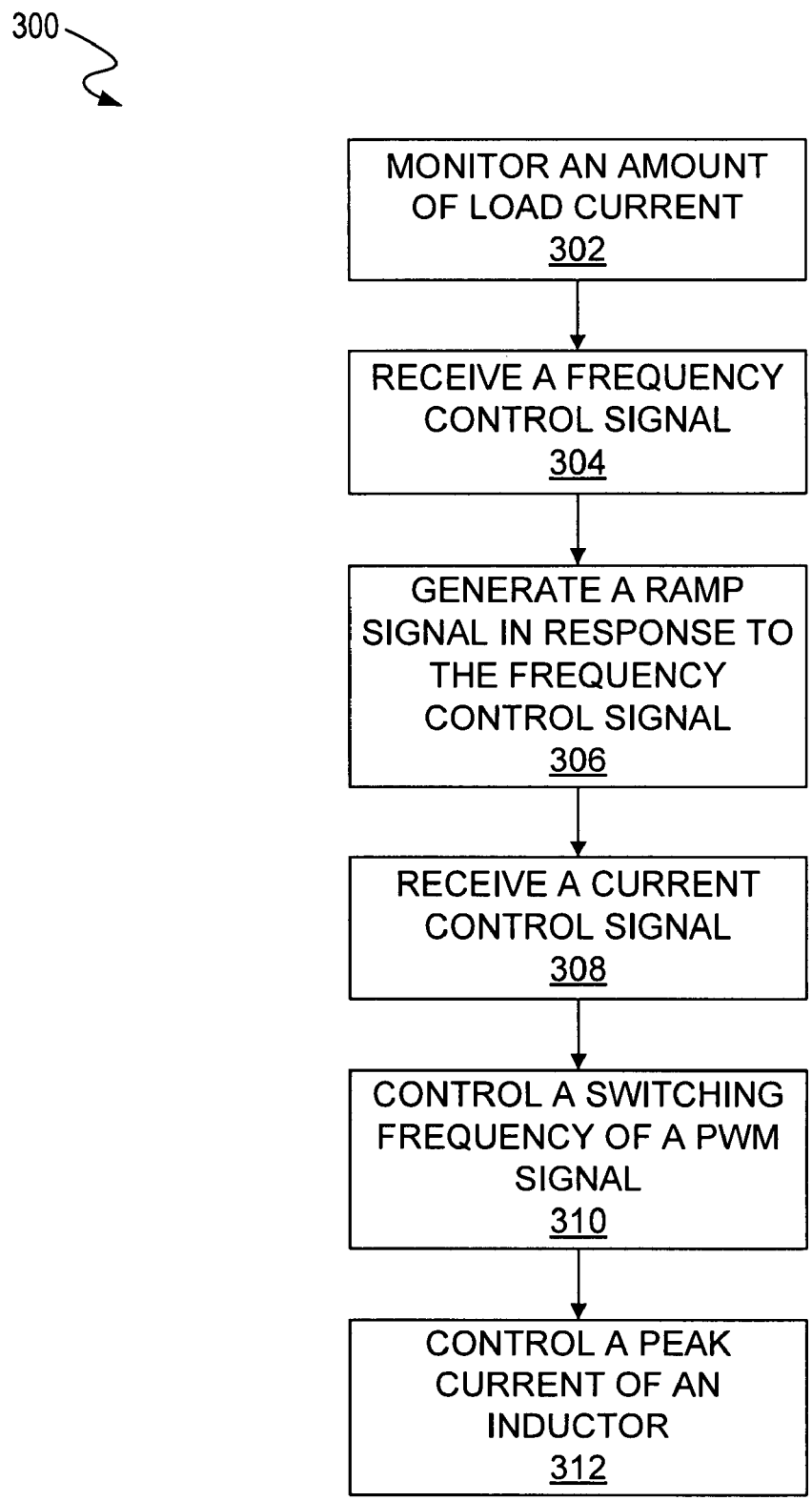
FIG. 3 shows a flowchart of a method for implementing a converter with pulse width modulation frequency control, in accordance with one embodiment of the present invention.

FIG. 3 shows a flowchart 300 of a method for implementing a converter with pulse width modulation frequency control, in accordance with one embodiment of the present invention. FIG. 3 will be described in combination with FIG. 1 and FIG. 2.

In block 302, an amount of load current is monitored. In one embodiment, the internal control circuit 104 monitors the load current 160A and the load current 160B. In block 304, the generator 102 (frequency control block) receives a frequency control signal. Such frequency control signal can be a first frequency control signal 126 from the internal control circuit 104 or a second frequency control signal 124 from the external control circuit 106, in one embodiment.

In block 306, a ramp signal 212 is generated by an oscillator 202 in response to the frequency control signal (first frequency control signal 126 and/or a second frequency control signal 124), in one embodiment. In block 308, a current control signal 226 can be received by an error amplifier 204 from the internal control block 104. More specifically, the current control signal 226 is used to determine the duty cycle of a pulse width modulation signal 132 for adjusting the load current, in one embodiment.

In block 310, a switching frequency of the pulse width modulation signal 132 is controlled/adjusted. The pulse width modulation signal 132 is generated by comparing the ramp signal 212 with the current control signal 226. As such, the switching frequency of the pulse width modulation signal 132 is determined by the frequency of the ramp signal 212 from the oscillator 202, in one embodiment. More specifically, the pulse width modulation signal 132 has a first switching frequency f1 when a load current (160A and/or 160B) is less than a predetermined current level I0. The pulse width modulation signal 132 has a second switching frequency f2 that is greater than the first switching frequency f1 when the load current (160A and/or 160B) is greater than the predetermined current level I0.

In block 312, a peak current of an inductor 110 is controlled. More specifically, the peak-to-peak ripple current of the inductor 110 reaches a first ripple current level $I_{sw1}$ when a load current (160A and/or 160B) is less then the predetermined current level I0. The peak-to-peak ripple current of the inductor 110 reaches a second ripple current level $I_{sw2}$ that is less than the first peak-to-peak ripple current level $I_{sw1}$ when the load current (160A and/or 160B) is greater than the predetermined current level I0.

Referring to the TABLE 1, examples of inductors' characteristics are shown. As the inductance increases, the DC-rating current will decrease as shown in the TABLE 1. Although an inductor with higher inductance will provide higher efficiency under light load condition, its allowed DC-rating current will be lower. For example, there are two inductors: inductor A (Part No. VLF3012AT-2R2M1R0) and inductor B (Part No. VLF3012AT-4R7MR74). The DC-rating current (rated current) of inductor A is equal to 1 A. The inductance of inductor A is equal to 2.2 uH. The DC-rating current (rated current) of inductor B is equal to 0.74 A. The inductance of inductor B is equal to 4.7 uH. The light load efficiency of inductor A is equal to 67%. The light load efficiency of inductor B is equal to 82%. The inductor peak current is usually 0.93 A when the inductor works under the high current/heavy load condition at 1 MHz switching frequency, in one embodiment.

TABLE 1

ELECTRICAL CHARACTERISTICS

| | | | | | | Rated current(A)* | |
|---|---|---|---|---|---|---|---|
| | | | | DC | | Based on | Based on |
| | Inductance | Inductance | Test frequency | resistance(Ω) | | inductance | temperature |
| Part No. | (μH) | tolerance(%) | (kHz) | max. | typ. | change max. | rise typ. |
| VLF3012AT-1R5N1R2 | 1.5 | ±30 | 100 | 0.068 | 0.059 | 1.2 | 1.6 |
| VLF3012AT-2R2M1R0 | 2.2 | ±20 | 100 | 0.1 | 0.088 | 1.0 | 1.3 |
| VLF3012AT-3R3MR87 | 3.3 | ±20 | 100 | 0.13 | 0.11 | 0.87 | 1.2 |
| VLF3012AT-4R7MR74 | 4.7 | ±20 | 100 | 0.19 | 0.16 | 0.74 | 0.98 |
| VLF3012AT-6R8MR59 | 6.8 | ±20 | 100 | 0.27 | 0.23 | 0.59 | 0.83 |
| VLF3012AT-100MR49 | 10 | ±20 | 100 | 0.41 | 0.36 | 0.49 | 0.67 |
| VLF3012AT-150MR41 | 15 | ±20 | 100 | 0.62 | 0.54 | 0.41 | 0.54 |
| VLF3012AT-220MR33 | 22 | ±20 | 100 | 0.76 | 0.66 | 0.33 | 0.49 |
| VLF3012AT-330MR27 | 33 | ±20 | 100 | 1.3 | 1.1 | 0.27 | 0.38 |
| VLF3012AT-470MR22 | 47 | ±20 | 100 | 2.2 | 1.9 | 0.22 | 0.29 |

Advantageously, in accordance with one embodiment of the present invention, the inductor B can be used to achieve higher efficiency. More specifically, the switching frequency can be increased during the high current/heavy load condition to lower the peak-to-peak current of the inductor B. For example, the switching frequency can be increased to 4 MHz during the high current/heavy load condition, in one embodiment. As such, the peak-to-peak ripple current of inductor B can be reduced to fall within the allowed DC-rating current (0.74 A) during high current/heavy load condition. Therefore, the inductor B can be used in the present embodiment instead of inductor A by controlling the switching frequency of the pulse width modulation signal according to different load conditions.

Figure 4A:
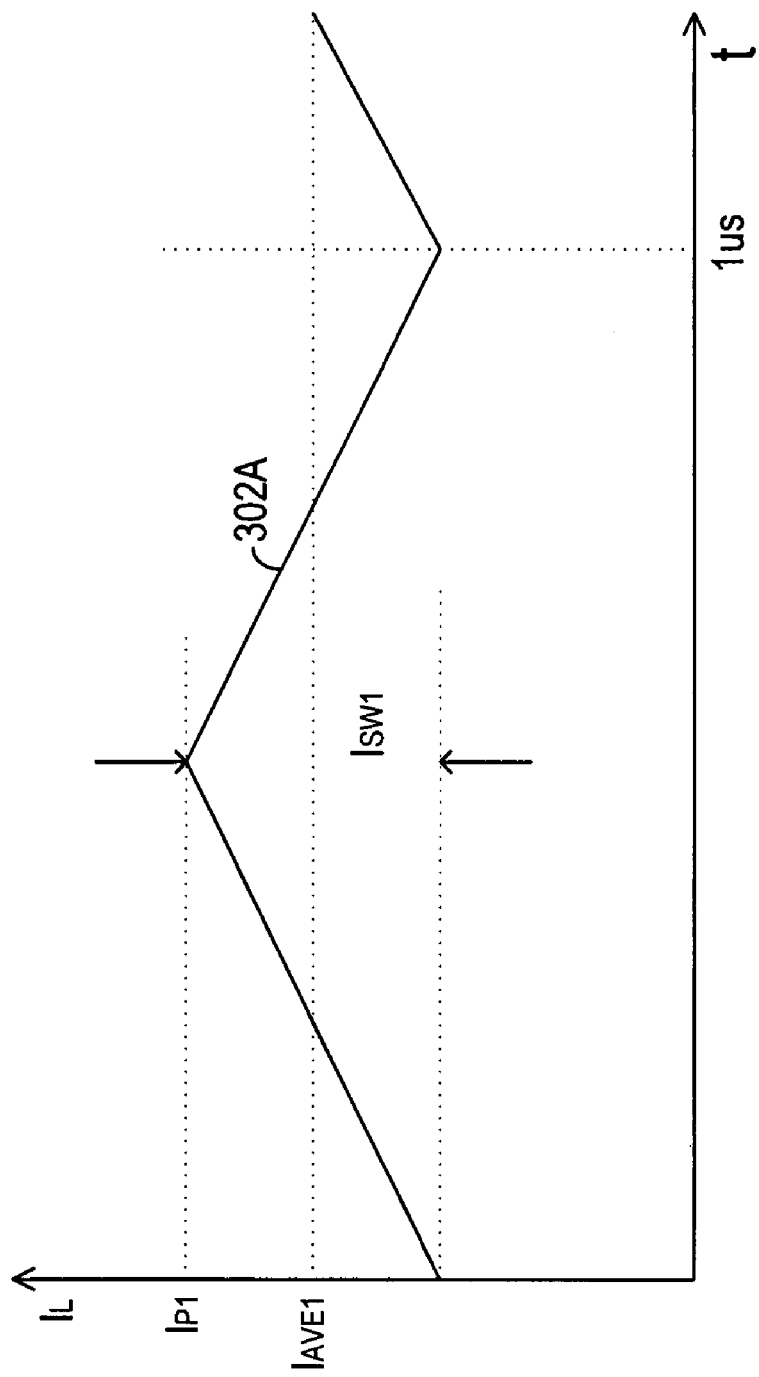
FIG. 4A shows a waveform representing the current through an inductor during a light load condition, in accordance with one embodiment of the present invention.

FIG. 4A shows a waveform 302A representing the current through inductor B during a light load condition, in accordance with one embodiment of the present invention. FIG. 4A is described in combination with FIG. 1 and FIG. 2. During the light load condition, the generator 102 is controlled to generate a pulse width modulation signal 132 with a first switching frequency f1 (e.g., f1=1 MHz). The generator 102 can be controlled by an internal control circuit 104 or an external control circuit 106, in one embodiment. As shown in FIG. 4A, the slope of the inductor current is equal to the input voltage $V_{in}$ at input 172 divided by the inductance $L_B$ ($V_{in}/L_B$). The inductor peak current $I_{p1}$ is equal to the summation of the average current $I_{ave1}$ and half of the peak-to-peak ripple current $I_{sw1}$ ($I_{p1}=I_{ave1}+I_{sw1}/2$).

Figure 4B:
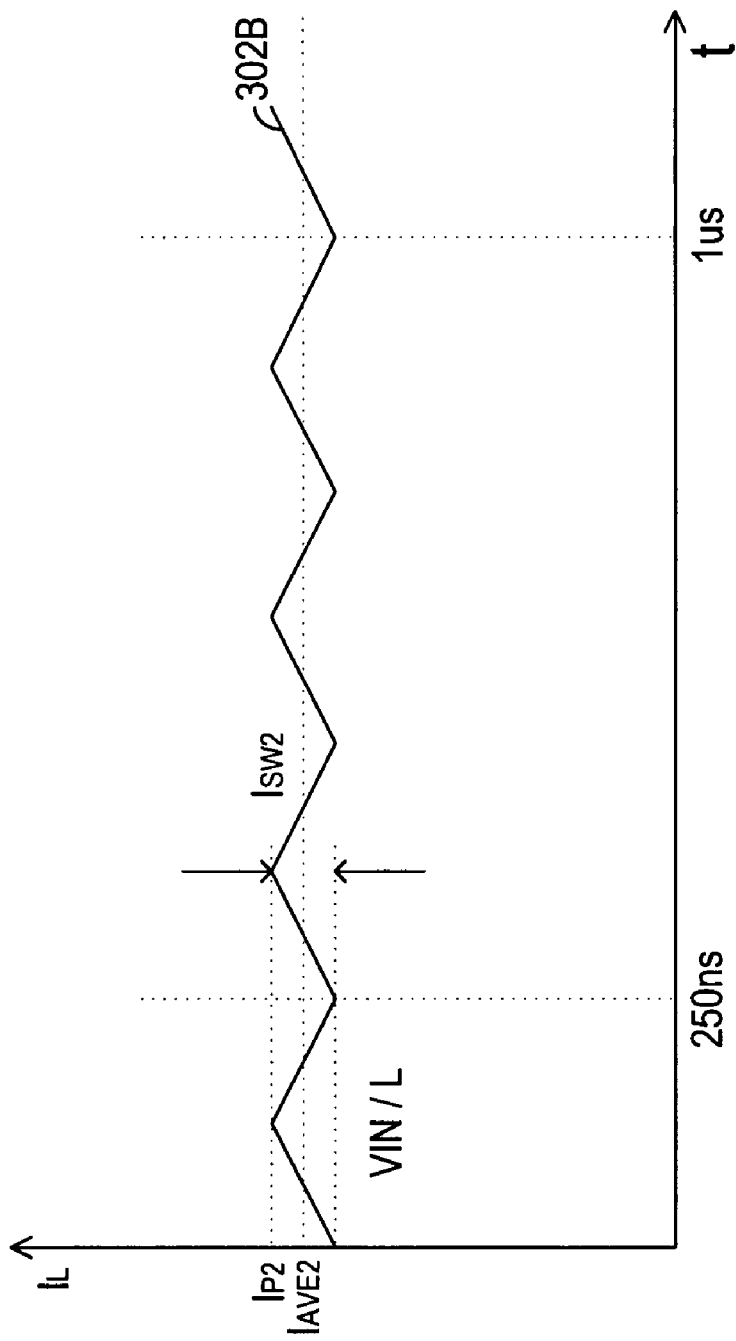
FIG. 4B shows a waveform representing the current through an inductor during a heavy load condition, in accordance with one embodiment of the present invention.

FIG. 4B shows a waveform 302B representing the current through inductor B during a heavy load condition, in accordance with one embodiment of the present invention. FIG. 4B is described in combination with FIG. 1 and FIG. 2. During the heavy load condition, the generator 102 is controlled to generate a pulse width modulation signal 132 with a second switching frequency f2 (e.g., f1=4 MHz) that is greater than the first switching frequency f1. As shown in FIG. 4B, the slope of the inductor current is equal to the input voltage $V_{in}$ at input 172 divided by the inductance $L_B$ ($V_{in}/L_B$). The inductor peak current $I_{p2}$ is equal to the summation of the average current $I_{ave2}$ and half of the peak-to-peak ripple current $I_{sw2}$ ($I_{p2}=I_{ave2}+I_{sw2}/2$).

As shown in FIG. 4A and FIG. 4B, higher switching frequency (f2>f1) can reduce the peak-to-peak ripple current ($I_{sw2}<I_{sw1}$) of the inductor, in one embodiment. Although the average current $I_{ave2}$ during the heavy load condition is greater than the average current $I_{ave1}$ during the light load condition, the inductor peak-to-peak ripple current $I_{sw2}$ during the heavy load condition is much less than the inductor ripple current $I_{sw1}$ during the light load condition. Consequently, the peak current of inductor B can be reduced to $I_{p2}$ at the switching frequency f2 during high current/heavy load condition, such that $I_{p2}$ is within the DC-rating current of inductor B (0.74 A). Therefore, inductor B can be used during both heavy load and light load conditions to achieve high efficiency, in accordance with one embodiment of the present invention.

Accordingly, embodiments of the present invention provide power management topologies with pulse width modulation frequency control. Advantageously, the switching frequency of a pulse width modulation signal can be adjusted according to different load conditions, in one embodiment. During a heavy load condition, the switching frequency will be increased (e.g., to 4 MHz) to reduce the peak-to-peak ripple current of the inductor. During a light load condition, the switching frequency will get back to the normal value (e.g., 1 MHz) to reduce switching loss and to achieve higher efficiency. Furthermore, a power management topology in accordance with one embodiment of the present invention also supports multiple output channels by one controller and one inductor in order to save space and reduce cost.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A converter comprising:
   a generator generating a pulse width modulation signal for controlling an inductor; and
   a control circuit coupled to said generator for controlling a switching frequency of said pulse width modulation signal,
   wherein a first switching frequency is selected when a load current is less than a predetermined current level, and wherein a second switching frequency that is greater than said first switching frequency is selected when said load current is greater than said predetermined current level,
   wherein a peak-to-peak ripple current of said inductor decreases from a first ripple current level to a second ripple current level that is less than said first ripple current level in response to said switching frequency of said pulse width modulation signal if said load current increases from a first current level that is less than said predetermined current level to a second current level that is greater than said predetermined current level.

2. The converter as claimed in claim 1, wherein said control circuit comprises an internal control circuit operable for monitoring said load current and generating a first frequency control signal to said generator for controlling said switching frequency.

3. The converter as claimed in claim 2, wherein said control circuit comprises an external control circuit operable for receiving an external control signal and generating a second frequency control signal to said generator for controlling said switching frequency.

4. The converter as claimed in claim 3, further comprising a communication signal line between said internal control circuit and said external control circuit.

5. The converter as claimed in claim 3, wherein said generator comprises an oscillator operable for receiving said first frequency control signal and said second frequency control signal, and for generating a ramp signal.

6. The converter as claimed in claim 5, wherein said internal control circuit further generates a current control signal to said generator for adjusting a duty cycle of said pulse width modulation signal.

7. The converter as claimed in claim 6, wherein said generator comprises an amplifier operable for receiving said ramp signal and said current control signal, and for generating said pulse width modulation signal.

8. The converter as claimed in claim 1, wherein said load current is selected from a first load current and a second load current that is greater than said first load current.

9. The converter as claimed in claim 1, further comprising a switch coupled to said inductor for receiving said pulse width modulation signal.

10. A method for powering a load, comprising:
    monitoring an amount of load current;
    controlling a switching frequency of a pulse width modulation signal to decrease a peak-to-peak ripple current of an inductor from a first ripple current level to a second ripple current level that is less than said first ripple current level if said load current increases from a first current level that is less than a predetermined current level to a second current level that is greater than said predetermined current level;
    wherein said pulse width modulation signal has a first switching frequency when said load current is less than said predetermined current level, and wherein said pulse width modulation signal has a second switching frequency that is greater than said first switching frequency when said load current is greater than said predetermined current level.

11. The method as claimed in claim 10, further comprising:
    receiving a frequency control signal for controlling said switching frequency.

12. The method as claimed in claim 11, wherein said frequency control signal is generated according to an external control signal.

13. The method as claimed in claim 12, further comprising:
generating a ramp signal in response to said frequency control signal.

14. The method as claimed in claim 13, further comprising:
receiving a current control signal for adjusting a duty cycle of said pulse width modulation signal, wherein said pulse width modulation signal is generated according to said current control signal and said ramp signal.

15. An electronic device comprising:
a load; and
a converter coupled to said load, comprising:
an inductor;
a generator generating a pulse width modulation signal for controlling said inductor;
an output for providing a load current to said load;
an internal control circuit operable for monitoring said load current and for generating a first frequency control signal to said generator for controlling said switching frequency; and
an external control circuit operable for receiving an external control signal and for generating a second frequency control signal to said generator for controlling said switching frequency,
wherein a first switching frequency is selected when said load current is less than a predetermined current level, wherein a second switching frequency that is greater than said first switching frequency is selected when said load current is greater than said predetermined current level,
wherein a peak-to-peak ripple current of said inductor decreases from a first ripple current level to a second ripple current level that is less than said first ripple current level in response to said switching frequency of said pulse width modulation signal if said load current increases from a first current level that is less than said predetermined current level to a second current level that is greater than said predetermined current level.

16. The electronic device as claimed in claim 15, wherein said internal control circuit transmits information to said external control circuit.

17. The electronic device as claimed in claim 15, wherein said external control circuit transmits information to said internal control circuit.

18. The electronic device as claimed in claim 15, wherein said internal control circuit further generates a current control signal to said generator for adjusting a duty cycle of said pulse width modulation signal.

19. The electronic device as claimed in claim 15, wherein said generator comprises an oscillator operable for receiving said first frequency control signal and said second frequency control signal, and for generating a ramp signal.

20. The electronic device as claimed in claim 19, wherein said generator comprises an amplifier for receiving said ramp signal and said current control signal, and for generating said pulse width modulation signal.

21. The electronic device as claimed in claim 15, further comprising a switch coupled to said inductor for receiving said pulse width modulation signal.

* * * * *

UNITED STATES PATENT AND TRADEMARK OFFICE
CERTIFICATE OF CORRECTION

| | | |
|---|---|---|
| PATENT NO. | : 7,898,218 B2 | |
| APPLICATION NO. | : 11/804495 | |
| DATED | : March 1, 2011 | |
| INVENTOR(S) | : Chun-Hsi Lin et al. | |

It is certified that error appears in the above-identified patent and that said Letters Patent is hereby corrected as shown below:

On the title page, item (73) Assignee should read: O2Micro International Limited, Grand Cayman (KY)

Signed and Sealed this
Tenth Day of May, 2011

David J. Kappos
*Director of the United States Patent and Trademark Office*